July 17, 1928.
C. L. MERRIMAN
1,677,285
LIQUID MEASURING AND DISPENSING APPARATUS
Filed July 24, 1924    2 Sheets-Sheet 2
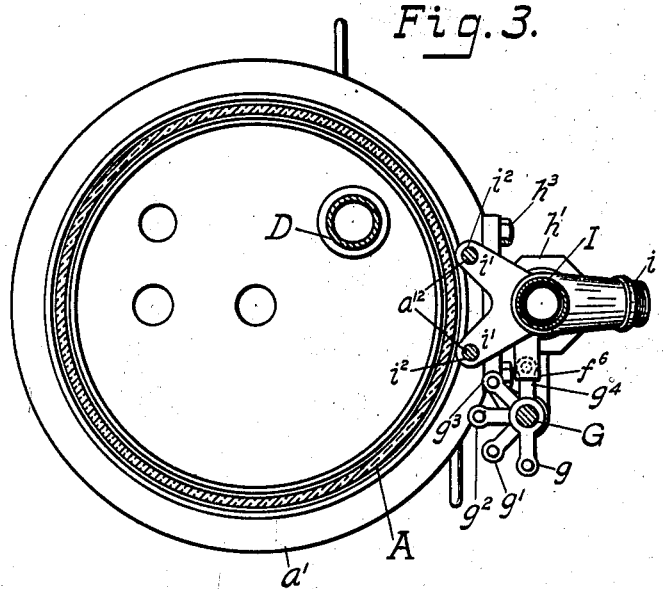
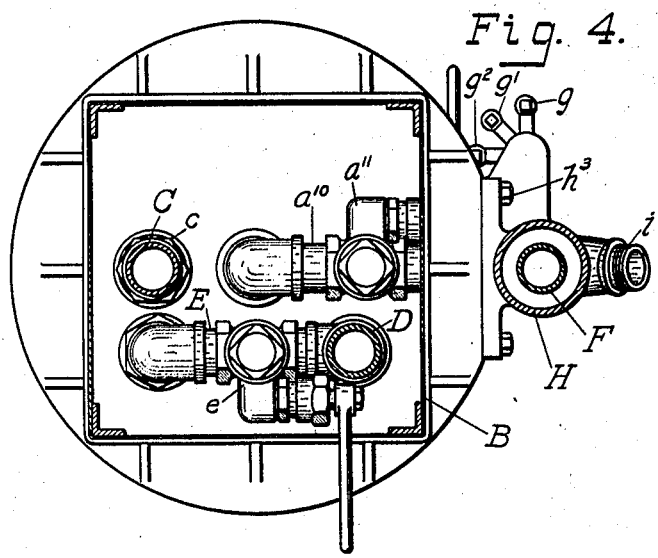
INVENTOR
Carroll L. Merriman
BY
Walter A. Knight
ATTORNEY Patented July 17, 1928.

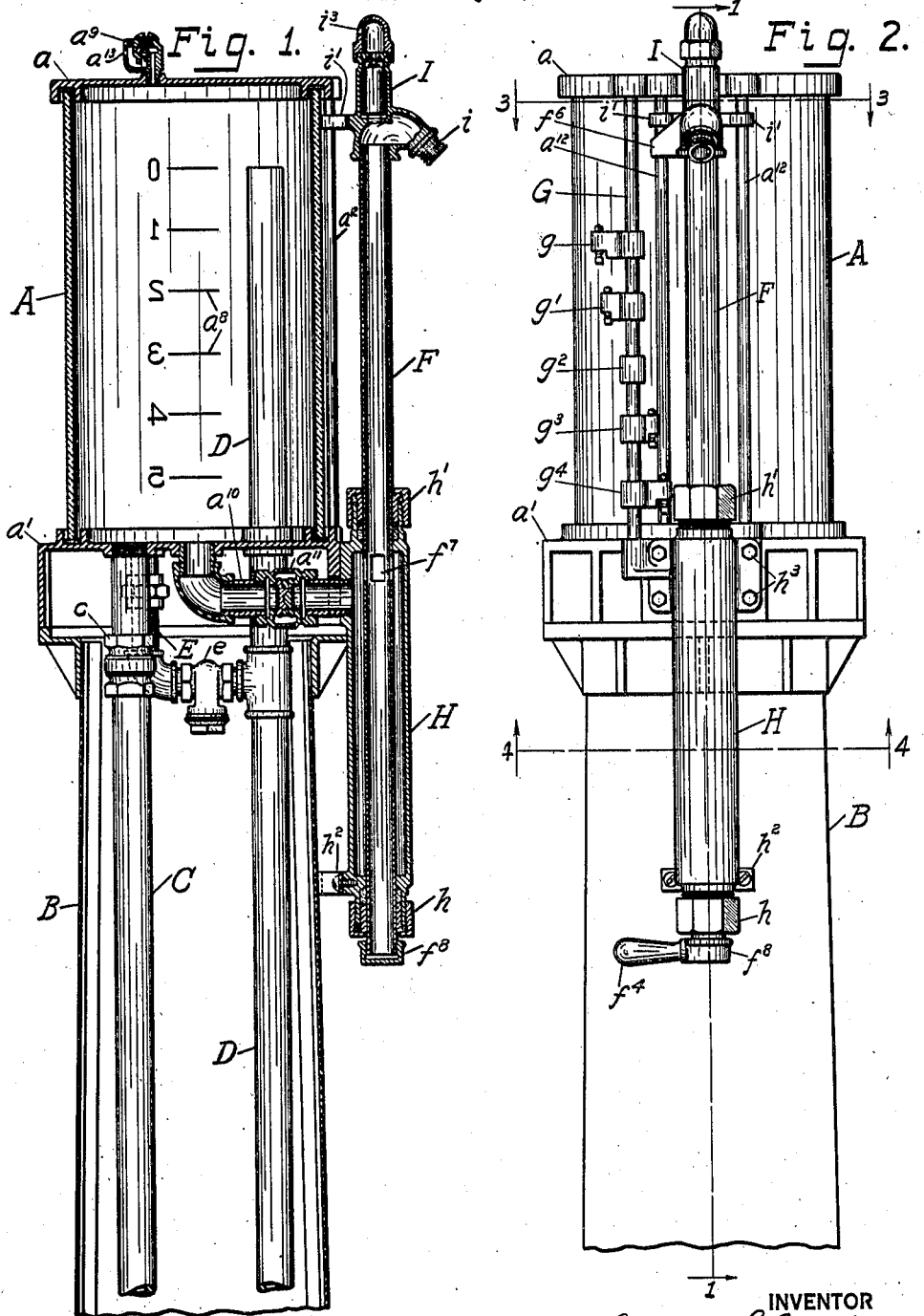
July 17, 1928.
C. L. MERRIMAN
LIQUID MEASURING AND DISPENSING APPARATUS
Filed July 24, 1924   2 Sheets-Sheet 1

1,677,285

UNITED STATES PATENT OFFICE.

CARROLL L. MERRIMAN, OF FORT WAYNE, INDIANA, ASSIGNOR TO WAYNE COMPANY, OF FORT WAYNE, INDIANA, A CORPORATION OF INDIANA.

LIQUID MEASURING AND DISPENSING APPARATUS.

Application filed July 24, 1924. Serial No. 727,934.

My invention relates to liquid measuring and dispensing apparatus of the so-called visible type, used particularly in selling gasoline.

The visible container is preferably provided with a fixed drain-back pipe and the container is adapted to be filled above the level of said pipe and thereafter immediately automatically drains back therethrough to zero on the scale usually provided in connection with said container. It is also provided with an adjustable tube on the serve side of the apparatus so that if from a five gallon container the purchaser desires to buy two gallons of liquid, the container may be filled, the adjustable tube brought down to the proper level, the serve valve opened and the liquid drained from the container to the two gallon level. If the customer then orders another gallon, the tube is lowered accordingly and the additional gallon dispensed, the serve tube being then at the three gallon level, and so on until the customer's tank is filled or the container emptied, all without refilling the container in whole or in part. Each such measurement will be accurate.

The principal object of my invention is to provide a new and improved apparatus of the character indicated, which will measure with accuracy different desired quantities of the liquid to be dispensed, it being possible to dispense a plurality of separate quantities, the sum of which is within the capacity of the container, without refilling said container.

Another object of my invention is to provide an apparatus of few and simple parts, every operation of which is in plain view of the customer.

My invention is illustrated in the accompanying drawings, in which:

Figure 1 is a gasoline measuring and dispensing apparatus in vertical section on the line 1—1 of Fig. 2, the fill pipe, drain-back and overflow pipes and attendant valves being shown in full; the bottom part of the casing and fill and overflow pipes being broken away.

Fig. 2 is an elevation on the serve-tube side of the apparatus with the bottom part of the casing broken away.

Fig. 3 is a horizontal cross-section on the line 3—3 of Fig. 2, and

Fig. 4 is a horizontal cross-section on the line 4—4 of Fig. 2.

Referring now to the drawings:—

A is the elevated visible container, made of glass or other transparent material with top $a$ vented at $a^9$ and bottom $a^1$. The container A is provided with graduations $a^8$ to indicate by the level of the liquid being dispensed from said container the number of gallons served.

The structure is supported upon a suitable pedestal B. Gasoline is forced from the source of supply (not shown) by any suitable means (not shown) through the fill pipe C into the visible container A, filling it to above the top of the open-ended fixed overflow pipe D. Return flow of liquid through the fill pipe C is prevented by a check valve $c$. Excess liquid in the container A is drained back to the source of supply through the overflow pipe D, which terminates on a level with the zero graduation on the scale. All liquid can be drained from the container A to the overflow pipe D and thence to the source of supply through the drain-back pipe E controlled by the valve $e$. With the level of the liquid standing at the maximum serve level, that is zero, five gallons in this apparatus, the operator is ready to serve gasoline to a customer.

Through the bottom $a^1$ of the container A is an opening connected by a cored passage or, as shown in the drawings, by fittings forming a conduit $a^{10}$, extending substantially horizontally to and connecting with a vertically positioned well H. Through this conduit $a^{10}$ gasoline flows from the visible container A to the well H and the flow is controlled by the valve $a^{11}$. This valve may be omited without sacrificing accuracy of measurement, and, as so constructed, the flow of liquid being dispensed may be quickly arrested by elevating the tube F.

Upwardly through the well H extends the tube F, which has an opening $f'$ to admit gasoline from the annular space between the exterior wall of the tube F and the interior wall of the well H. The tube F is closed at the bottom by a cap $f^8$ and to this cap is fixed a handle $f^4$ used in vertically adjusting the tube F. The well H has a stuffing box $h$ at its bottom and another stuffing box $h^1$ at its top so as to make leak-tight joints between the well H and the tube F. The tube F terminates above in a vented drain valve fitting I of any usual type, provided with a hose connection $i$ and with guide lugs $i^1$ with openings $i^2$ pierced by guide rods $a^{12}$. The well H is secured at the bottom to the pedestal B by a bracket $h^2$ and the top is secured directly to the container bottom $a^1$ by bolts $h^3$ or in any other suitable manner.

Quantity stop mechanism of any convenient form is provided to accurately limit the downward movement of the tube F as desired. The mechanism shown consists of a quantity stop rod G with stops $g$, $g^1$, $g^2$, $g^3$ and $g^4$ thereon to limit the depression of the tube F by contact with the lug $f^6$ so as to limit the quantity of liquid dispensed to 1, 2, 3, 4 or 5 gallons respectively.

While in service, for accurate measurement the tube F always remains full of gasoline.

The vent hole $i^3$ in the drain valve I and the vent hole $a^{13}$ in the container vent fitting $a^9$ maintain atmospheric pressure at all times on the surface of the liquid in the tube F and container A respectively to insure the same level of liquid in the tube as in the container at the completion of any delivery for which the tube F is set.

Many changes may be made in this apparatus without departing from the spirit of my invention and all forms of apparatus readable upon the claims finally allowed hereon are within the scope of my invention.

The operation of the apparatus is as follows:—

Assume that the particular apparatus has never been in use; force gasoline into the container A until it is full to above the level of the overflow pipe D, the tube F being in any position desired, for instance in the position shown in Figs. 1 and 2, which is extreme raised position. The conduit $a^{10}$ will fill with gasoline to the valve $a^{11}$. Then open the valve $a^{11}$ and lower the tube F until it is filled with gasoline and overflows through the hose connection $i$. The tube F being now full of gasoline, let us suppose that a customer comes and orders three gallons of gasoline. The container A may be filled, that is, until when all excess gasoline has been run back to storage through the fixed overflow pipe D, the top level of the gasoline in the container A standing at O, that is, showing five gallons in the container ready to be served. The operator rotates the stop $g^2$ until it rests in the vertical path of the lug $f^6$. Then the operator grasps the handle $f^4$ and lowers the tube F until the lug $f^6$ contacts with the stop $g^2$ and will not permit the tube F to be lowered further. The operator now opens the valve $a^{11}$ and holds it open until the gasoline has drained out through the hose to the customer's tank, so that the top level of the gasoline in the container A is at 3 on the scale. If the customer then orders another gallon, the stop $g^3$ is rotated into the path of the lug $f^6$, the tube F is further lowered until said lug contacts with said stop. The valve $a^{11}$ is again opened and held open until another gallon has been served; and so on.

When the container A is to be drained back to storage, the tube F may be left in any position, the valve $e$ is opened and kept open until the gasoline in the container A has all drained back through the drain-back pipe E and through the overflow pipe D to the source of supply.

I claim as my invention and desire to secure by Letters Patent of the United States:—

1. In combination with a liquid measuring and dispensing apparatus having an elevated container from which liquid is dispensed, a vertically positioned well through which the liquid dispensed passes, a conduit connecting the bottom of said container with said well, a vertically adjustable outlet tube closed at its lower end and extending through said well, an opening in said tube, at such a position as always to remain within said well to admit liquid from the well to the interior of the tube, vented means secured to the top of said tube adapted to form a cap for same, and a conduit through which liquid may be served from said tube.

2. In combination with a liquid measuring and dispensing apparatus having an elevated container from which liquid is dispensed, a vertically positioned well through which the liquid dispensed passes, a conduit connecting the bottom of said container with said well, a vertically adjustable outlet tube closed at its lower end and extending through said well, an opening in said tube at such a position as always to remain within said well to admit liquid from the well to the interior of the tube, a valve controlling the flow of liquid through said tube and vented means secured to the top of said tube adapted to form a cap for same, and a conduit through which liquid may be served from said tube.

3. In combination with a liquid measuring and dispensing apparatus having a transparent elevated container from which liquid is dispensed, a well through which the liquid dispensed passes, a conduit adapted to drain the contents of said container into said well, an outlet tube slidably adjustable vertically, closed at its lower end and extending through said well, an opening in said tube at such a position as always to remain within said well to admit liquid from the well to the interior of the tube, a valve controlling the flow of liquid through said tube and vented means secured to the top of said tube to form a cap for same, a conduit through which liquid may be served from said tube.

4. In combination with a liquid measuring and dispensing apparatus having a transparent elevated container from which liquid is dispensed, a well through which the liquid dispensed passes, a conduit adapted to drain the contents of said container into said well, an outlet tube slidably adjustable vertically, closed at its lower end and extending through said well, an opening in said tube at such position as always to remain within said well to admit liquid from the well to the interior of the tube, a valve controlling the flow of liquid through said tube, means by which said tube may be raised and lowered, stop mechanism to control the extent to which said tube shall be lowered to insure the dispensing of the quantity of liquid desired, and vented means secured to the top of said tube to form a cap for same, and a conduit through which liquid may be served from said tube.

5. In combination with a liquid measuring and dispensing apparatus having an elevated container from which liquid is dispensed, a well through which the liquid dispensed is passed, a conduit adapted to drain the contents of said container into said well, an outlet tube slidably adjustable vertically, closed at its lower end and extending through said well, a stuffing box at the lower end and a stuffing box at the upper end of said well through which said tube passes, an opening in said tube at such a position as always to remain within said well to admit liquid from the well to the interior of the tube, and vented means secured to the top of said tube adapted to form a cap for same and a conduit through which liquid may be served from said tube.

6. In combination with a liquid measuring and dispensing apparatus having a transparent elevated container from which liquid is dispensed, a vertically positioned well outside said container through which the liquid dispensed is passed, a conduit adapted to drain the contents of said container into said well, an outlet tube slidably adjustable vertically, closed at its lower end and extending through said well, a stuffing box at the lower end and another at the upper end of said well through which said tube passes, an opening in said tube at such a position as always to remain within said well to admit liquid from the well to the interior of the tube, the upper discharge end of said tube formed for connection to a hose, separate guiding means for said tube, a handle by which said tube may be raised and lowered, and means for equalizing the pressure on the surfaces of the liquid in said container and said tube.

7. In combination with a liquid measuring and dispensing apparatus having a transparent elevated container from which liquid is dispensed, means for delivering liquid to said container, means for draining back the excess liquid from said container, means for completely draining the contents of said container to the source of supply, a vertically positioned well outside said container through which the liquid dispensed is passed, a conduit adapted to drain the contents of said container into said well, an outlet tube slidably adjustable vertically, closed at its lower end and extending through said well, a stuffing box at the lower end and another at the upper end of said well through which said tube passes, an opening in said tube at such a position as always to remain within said well to admit liquid from the well to the interior of the tube, a valve controlling the flow of liquid through said tube, the upper discharge end of said tube formed for connection to a hose, separate guiding means for said tube, a handle by which said tube may be raised and lowered, and means for equalizing the pressures on the surfaces of the liquid in said container and said tube.

8. In combination with the elevated container of a liquid measuring and dispensing apparatus, a vertical well through which the liquid dispensed passes and a stuffing box at each end of said well, a valved conduit adapted to drain the contents of said container into said well, an outlet tube slidably adjustable vertically, closed at its lower end, formed at its upper end for connection to a hose and extending through said well, the outlet end of said tube adapted to take any position below the top of said container and above the top of said well so that said container may be drained to different levels by adjusting the vertical height of said outlet tube.

9. In combination with a liquid measuring and dispensing apparatus having a transparent elevated container from which liquid is dispensed, means for delivering liquid to said container, means for completely draining the contents of said container to the source of supply, a vertically positioned well outside said container through which the liquid dispensed is passed, a conduit adapted to drain the contents of said container into said well, an outlet tube slidably adjustable vertically, closed at its lower end, a stuffing box at the lower end and another at the upper end of said well through which said tube passes, an opening in said tube at such a position as always to remain within said well to admit liquid from the well to the interior of the tube, a valve controlling the flow of liquid through said tube, the upper discharge end of said tube formed for connection to a hose, separate guiding means for said tube, a handle by which said tube may be raised and lowered, stop mechanism to control the extent to which said tube shall be lowered to insure the dispensing of the quantity of liquid desired, and means for equalizing the pressures on the surfaces of the liquid in said container and said tube.

In testimony whereof I have hereunto set my hand.

CARROLL L. MERRIMAN.